United States Patent
Bignert et al.

(10) Patent No.: US 9,152,730 B2
(45) Date of Patent: Oct. 6, 2015

(54) EXTRACTING PRINCIPAL CONTENT FROM WEB PAGES

(75) Inventors: Jakob Bignert, Mountain View, CA (US); Gabriel Alexandru Coarna, Bucharest (RO)

(73) Assignee: Evernote Corporation, Redwood City, CA (US)

(*) Notice: Subject to any disclaimer, the term of this patent is extended or adjusted under 35 U.S.C. 154(b) by 351 days.

(21) Appl. No.: 13/563,060

(22) Filed: Jul. 31, 2012

(65) Prior Publication Data

US 2013/0124513 A1    May 16, 2013

Related U.S. Application Data

(60) Provisional application No. 61/558,153, filed on Nov. 10, 2011.

(51) Int. Cl.
*G06F 17/30* (2006.01)

(52) U.S. Cl.
CPC ...... *G06F 17/3089* (2013.01); *G06F 17/30707* (2013.01)

(58) Field of Classification Search
CPC ............... G06F 17/30864; G06F 17/30867
USPC .................................. 707/728, 727
See application file for complete search history.

(56) References Cited

U.S. PATENT DOCUMENTS

| | | | |
|---|---|---|---|
| 4,860,372 A * | 8/1989 | Kuzunuki et al. | 382/189 |
| 6,983,282 B2 * | 1/2006 | Stern et al. | 707/805 |
| 7,058,695 B2 | 6/2006 | Takagi et al. | |
| 7,065,483 B2 | 6/2006 | Decary et al. | |
| 7,137,067 B2 | 11/2006 | Yanase et al. | |
| 7,467,206 B2 | 12/2008 | Moore et al. | |
| 7,653,621 B2 * | 1/2010 | Senthil | 706/48 |
| 8,015,418 B2 * | 9/2011 | Warnock et al. | 713/193 |
| 8,073,865 B2 * | 12/2011 | Davis | 707/769 |
| 8,281,232 B2 * | 10/2012 | Vishria et al. | 715/208 |
| 8,468,445 B2 * | 6/2013 | Gupta et al. | 715/234 |
| 8,819,028 B2 * | 8/2014 | Luo et al. | 707/748 |
| 2006/0150069 A1 | 7/2006 | Chang | |
| 2006/0274086 A1 | 12/2006 | Forstall et al. | |

(Continued)

OTHER PUBLICATIONS

Gupta et al, "Automating Content Extraction of HTML Documents", 2004 Kluwer Academic Publishers, pp. 1-41.*

(Continued)

*Primary Examiner* — Rehana Perveen
*Assistant Examiner* — Loc Tran
(74) *Attorney, Agent, or Firm* — Muirhead & Saturnelli, LLC

(57) ABSTRACT

Extracting principal content from Web pages includes identifying and classifying items on the Web page, building a list of candidates, calculating candidate scores, selecting a top score candidate, performing clean up processing for the top score candidate, and performing final page processing for the top score candidate. Candidate scores may vary according to a number of paragraphs and images grouped according to size. A word length of CJK (Chinese-Japanese-Korean) text may be determined according to punctuation therein. Candidate scores may be modified according to a number of containers and pieces and wherein a container is a Web page element that is associated with tags 'body', 'div', 'td', 'li', 'article/section' and pieces are candidates that do not include other candidates. Candidate scores may be modified according to a number of ratios corresponding to text and link density.

30 Claims, 10 Drawing Sheets

(56) References Cited

U.S. PATENT DOCUMENTS

| | | |
|---|---|---|
| 2007/0006067 A1 | 1/2007 | Kikuchi |
| 2008/0109426 A1 | 5/2008 | Constantinides |
| 2008/0139191 A1 | 6/2008 | Melnyk et al. |
| 2008/0201633 A1 | 8/2008 | Huang et al. |
| 2009/0119284 A1 | 5/2009 | Chen et al. |
| 2009/0198684 A1* | 8/2009 | Collins et al. ............ 707/5 |
| 2011/0066662 A1 | 3/2011 | Davis |
| 2011/0119571 A1 | 5/2011 | Decker et al. |
| 2012/0059811 A1 | 3/2012 | Libin et al. |
| 2012/0060098 A1 | 3/2012 | Libin et al. |
| 2012/0191728 A1 | 7/2012 | Libin et al. |
| 2013/0155463 A1* | 6/2013 | Jin et al. ............ 358/1.15 |
| 2013/0212463 A1 | 8/2013 | Pachikov et al. |

OTHER PUBLICATIONS

Gupta et al, "Automating Content Extraction of HTML Documents", 2004 Kluwer Academic Publishers, 41 pages.*

* cited by examiner

EXTRACTING PRINCIPAL CONTENT FROM WEB PAGES

RELATED APPLICATIONS

This application claims priority to U.S. Prov. App. No. 61/558,153, filed Nov. 10, 2011, and entitled "Method and apparatus for extracting principal content from Web pages," which is incorporated herein by reference.

TECHNICAL FIELD

This application relates to the field of analyzing, processing and presenting information, and more particularly to the field of analyzing, processing and presenting information in connection with Web sites.

BACKGROUND OF THE INVENTION

In 2011, over two billions of Web users were reading contents of more than 14 billion Web pages in numerous languages, formats and layouts. Thanks to a variety of technological, economical, aesthetical and other factors, modern designs of Web pages are becoming increasingly sophisticated; examples of diverse content elements simultaneously present on Web pages include articles, navigation panels, text and link boxes, images and icons, advertising buttons, banners, dynamic and interactive advertising contents, embedded video clips, overlays, pop-ups, floating elements, forms, etc. While each of these elements has its own place within integrated Web experience, rich Web layouts may interfere with an immediate goal of uninterrupted and concentrated reading by a Web page visitor of item(s) presented on the page, such as news or research article, blog post, list of search results, article headings, and other principal content types. Some Web sites, such as Yahoo News slideshows, deliver separate clean views of articles after clicking on news items. In addition, browser features, such as Safari Reader on iPad, attempt to extract significant pieces of content from arbitrary Web pages. However, existing methods of processing complex Web layouts do not work exceptionally well for many types of Web page content, such as search lists and headings, multipage articles, etc. The existing techniques do not consistently extract important components of key page items, such as article title, author and publication date, and have difficulty processing international pages. Accordingly, it would be desirable to provide enhanced systems that simplifies Web page layouts for viewers, determining principal page content, presenting it to user in best readable format, and allowing easy and convenient clipping to personal note sets such as the Evernote product provided by Evernote Corporation of Redwood City, Calif.

SUMMARY OF THE INVENTION

According to the system described herein, extracting principal content from Web pages includes identifying and classifying items on the Web page, building a list of candidates, calculating candidate scores, selecting a top score candidate, performing clean up processing for the top score candidate, and performing final page processing for the top score candidate. Candidate scores may vary according to a number of paragraphs and images grouped according to size. A word length of CJK (Chinese-Japanese-Korean) text may be determined according to punctuation therein. Calculating candidate scores may include determining an Initial Score using the formula:

$$\text{Initial Score} = 1000 \times (1.5 \times (N_{5\text{-line-paragraphs}} + N_{80\text{-word-paragraphs}}) + N_{3\text{-line-paragraphs}} + N_{50\text{-word-paragraphs}} + 3 \times N_{large\text{-}images} - 0.5 \times (N_{small\text{-}images} + N_{skipped\text{-}images}))$$

where $N_{5\text{-line-paragraphs}}$ is a number of five line paragraphs in the candidate, $N_{80\text{-word-paragraphs}}$ is a number of 80 word paragraphs in the candidate, $N_{3\text{-line-paragraphs}}$ is a number of 3 line paragraphs in the candidate, $N_{50\text{-word-paragraphs}}$ is a number of 50 word paragraphs in the candidate, $N_{large\text{-}images}$ is a number of images that contain at least 50K pixels or have a width of at least 350 pixels and a height of at least 75 pixels, $N_{skipped\text{-}images}$ is a number of images that have a size not exceeding 5×5 or are present on Web page as references to at least one of: blacklisted and quarantined sites, and all other images are count toward $N_{small\text{-}images}$. Candidate scores may be modified according to a number of containers and pieces and wherein a container is a Web page element that is associated with tags 'body', 'div', 'td', 'li', 'article/section' and pieces are candidates that do not include other candidates. Candidate scores may be modified using a formula:

$$\text{Modified Initial Score} = \text{Initial Score} \times (\tfrac{1}{3} + \tfrac{2}{3} \times \tfrac{1}{3} \times (1/N_{pieces} + 1/N_{candidates} + 1/N_{containers})).$$

Candidate scores may be modified according to a number of ratios corresponding to text and link density. The ratios may include a ratio of a length of regular text for the candidate to a total length of regular text, a number of words in regular text of the candidate to a total number of words in regular text, a length of regular text above the candidate to a total length of regular text, and a number of words in regular text above the candidate to a total number of words in regular text. Candidate scores may be modified using a formula:

$$\text{Modified Initial Score}_{n+1} = \text{Modified Initial Score}_n \times (\text{Percentage}_n \times (\text{ratio}^{degree})_n + (100 - \text{Percentage}_n))/100$$

where $\text{Percentage}_n$ and $\text{ratio}^{degree}$ are predetermined values that are empirically determined for each of n ratios. Extracting principal content from Web pages may also include, following selecting the top score candidate, determining if the top score candidate meets predetermined criteria and, if the top score candidate does not meet predetermined criteria, determining if a different top score candidate should be selected. A first set of formulas may be used to determine the top score candidate and a second, different, set of formulas may be used to determine if a different top score candidate should be selected. A different top score candidate may not be used if using the second set of formulas results in the same top score candidate as using the first set of formulas. The predetermined criteria may be selected from the group consisting of: whether the top score candidate has less than 25 embedded containers, where a container is a Web page element that is associated with tags 'body', 'div', 'td', 'li', 'article/section', whether the top score candidate has no embedded other candidates and whether the top score candidate has no more than three embedded candidates that have other embedded candidates. Performing clean up processing may include removing floating elements, link boxes, navigation panels, and videos from unknown sources. Performing clean up processing may include reformatting the top scoring candidate by rewriting the text thereof as a new HTML page using only feasible HTML tags and attributes and ignoring stylistic deficiencies and unnecessary elements in the original page format. Extracting principal content from Web pages may also include a user providing an indication of portions of a displayed top score candidate and clipping portions indicated by the user, where the portions are subsequently used by other software.

According further to the system described herein, computer software, provided in non-transitory computer-readable media, extracts principal content from Web pages. The software includes executable code that identifies and classifies items on the Web page, executable code that builds a list of candidates, executable code that calculates candidate scores, executable code that selects a top score candidate, executable code that performs clean up processing for the top score candidate and executable code that performs final page processing for the top score candidate. Candidate scores may vary according to a number of paragraphs and images grouped according to size. A word length of CJK (Chinese-Japanese-Korean) text may be determined according to punctuation therein. Executable code that calculates candidate scores may determines an Initial Score using the formula: Initial Score=$1000 \times (1.5 \times (N_{5\text{-}line\text{-}paragraphs} + N_{80\text{-}word\text{-}paragraphs}) + N_{3\text{-}line\text{-}paragraphs} + N_{50\text{-}word\text{-}paragraphs} + 3 \times N_{large\text{-}images} - 0.5 \times (N_{small\text{-}images} + N_{skipped\text{-}images}))$, where $N_{5\text{-}line\text{-}paragraphs}$ is a number of five line paragraphs in the candidate, $N_{80\text{-}word\text{-}paragraphs}$ is a number of 80 word paragraphs in the candidate, $N_{3\text{-}line\text{-}paragraphs}$ is a number of 3 line paragraphs in the candidate, $N_{50\text{-}word\text{-}paragraphs}$ is a number of 50 word paragraphs in the candidate, $N_{large\text{-}images}$ is a number of images that contain at least 50K pixels or have a width of at least 350 pixels and a height of at least 75 pixels, $N_{skipped\text{-}images}$ is a number of images that have a size not exceeding 5×5 or are present on Web page as references to at least one of: blacklisted and quarantined sites, and all other images are count toward $N_{small\text{-}images}$. Candidate scores may be modified according to a number of containers and pieces and wherein a container is a Web page element that is associated with tags 'body', 'div', 'td', 'li', 'article/section' and pieces are candidates that do not include other candidates. Candidate scores may be modified using a formula: Modified Initial Score=Initial Score$\times (1/3 + 2/3 \times 1/3 \times (1/N_{pieces} + 1/N_{Candidates} + 1/N_{Containers}))$. Candidate scores may be modified according to a number of ratios corresponding to text and link density. The ratios may include a ratio of a length of regular text for the candidate to a total length of regular text, a number of words in regular text of the candidate to a total number of words in regular text, a length of regular text above the candidate to a total length of regular text, and a number of words in regular text above the candidate to a total number of words in regular text. Candidate scores may be modified using a formula: Modified Initial Score$_{n+1}$=Modified Initial Score$_n \times$(Percentage$_n \times$(ratio$^{degree}$)$_n$+(100–Percentage$_n$))/100, where Percentage$_n$ and ratio$^{degree}$ are predetermined values that are empirically determined for each of n ratios. The computer software may also include executable code that determines if the top score candidate meets predetermined criteria following selecting the top score candidate and executable code that determines if a different top score candidate should be selected if the top score candidate does not meet the predetermined criteria. A first set of formulas may be used to determine the top score candidate and a second, different, set of formulas is used to determine if a different top score candidate should be selected. A different top score candidate may not be used if using the second set of formulas results in the same top score candidate as using the first set of formulas. The predetermined criteria may be selected from the group consisting of: whether the top score candidate has less than 25 embedded containers, wherein a container is a Web page element that is associated with tags 'body', 'div', 'td', 'li', 'article/section', whether the top score candidate has no embedded other candidates and whether the top score candidate has no more than three embedded candidates that have other embedded candidates. Performing clean up processing may include removing floating elements, link boxes, navigation panels, and videos from unknown sources. Executable code that performs clean up processing may reformat the top scoring candidate by rewriting the text thereof as a new HTML page using only feasible HTML tags and attributes and may ignore stylistic deficiencies and unnecessary elements in the original page format. The software may also include executable code that clips portions indicated by the user, where the portions are subsequently used by other software.

According further to the system described herein, identifying separate portions of a principal item provided on multiple Web pages includes determining a last non-empty segment of the path of a URL containing a portion of the principal item, determining a similarity measure between the URL and other URLs on the page corresponding to the last non-empty segment of the path, examining Web link text for words indicating additional portions of the principal item on Web pages corresponding to sufficiently similar URLs, and determining whether additional portions of the principal item are provided on at least some of the Web pages according to the similarity measure and the presence of words indicating additional portions. The words indicating additional portions may include page numbers or the term "next". The similarity measure may be selected from the group consisting of: edit distance, Levenstein's distance, and a length of a Largest Common Substring. Identifying separate portions of a principal item provided on multiple Web pages may also include confirming consistency of the portions. Confirming consistency may include extracting an article title from the portions and comparing the article with a previously-determined original title.

According further to the system described herein, computer software, provided in a non-transitory computer-readable medium, identifies separate portions of a principal item provided on multiple Web pages. The software includes executable code that determines a last non-empty segment of the path of a URL containing a portion of the principal item, executable code that determines a similarity measure between the URL and other URLs on the page corresponding to the last non-empty segment of the path, executable code that examines Web link text for words indicating additional portions of the principal item on Web pages corresponding to sufficiently similar URLs, and executable code that determines whether additional portions of the principal item are provided on at least some of the Web pages according to the similarity measure and the presence of words indicating additional portions. The words indicating additional portions may include page numbers or the term "next". The similarity measure may be selected from the group consisting of: edit distance, Levenstein's distance, and a length of a Largest Common Substring. The software may also include executable code that confirms consistency of the portions. The executable code that confirms consistency may extract an article title from the portions and comparing the article with a previously-determined original title.

Extracting principal content, as extracted principal content, from Web pages, includes identifying principal items within the Web page content. In identifying principal items on Web pages, the system described herein relies on a sequence of cleaning and ranking steps, as explained elsewhere herein, based on heuristics that have been experimentally proven to work well with actual Web pages. Prior to conducting such cleaning and ranking steps, the system described herein performs page analysis, as explained in details elsewhere herein, pertaining to page elements (HTML tags) and their structure, subordination and mutual disposition within the page, presence and volume of text and links, measured in characters, words, and special types of paragraphs, quantity, location, and size of images, and other types of page contents.

The system described herein determines qualifying elements on a Web page, deemed herein as "Containers" and "Candidates", in the process of identifying principal items of a Web page. Following initial cleaning of a Web page and building the set of qualifying elements, the system scores of Candidates, based on a two-phase calculation with multiplicative score system at the second phase are determined, as explained elsewhere herein. Candidates are ranked by their calculated scores, and principal page item with top score is chosen among the candidates. Subsequently, a stop rule is applied, which may terminate search for the best Candidate or justify additional ranking step where the procedure of score calculations with modified parameters and multipliers is applied again to Candidates. If the additional step results in the same top score Candidate, the Candidate is chosen as the principal Web page item. On the other hand, if the additional steps result in a different winner, the final round of score calculation is applied to the two top score Candidates identified at the first set of steps and the additional steps, as explained elsewhere herein. The final round of calculations also uses modified parameters and multipliers. The Candidate with the top score at the final step of calculations is declared the principal item on the Web page.

Subsequent processing of the principal item found on a Web page prior to displaying it to viewer is provided, as explained elsewhere herein. The processing starts with cleaning the content of the principal item by removing certain HTML elements deemed herein as "Disposables". Examples of Disposables include floating elements, link boxes, navigation panels, and videos from unknown sources. Subsequently, HTML text of a Web page above the principal item is scanned for the presence of a potentially omitted textual title and possibly sub-title, as well as author, publication date and/or other content related to principal item, as explained elsewhere herein. If such title/author/date info is reliably identified, the information is added to principal item.

A principal item found on a page is subsequently analyzed for presence of multi-page content. The analysis includes identifying diverse elements indicating additional pages, such as page number list, indicators of next and previous pages and other characteristic navigation elements, retrieving links to extra pages associated with such elements, opening accompanying pages, extracting, and cleaning the principal content item(s) of the accompanying pages using the system described herein. The system also verifies that multi-page content belongs to the principal item itself rather than to accompanying items such as multi-page comments to a multi-page blog post. After additional pages of principal content are extracted, cleaned and verified, the additional pages are appended to previously accumulated content of principal item.

The system described herein includes reformatting of principal item for viewer-friendly display to a page visitor. Reformatting includes re-writing HTML text of principal item and eliminating certain stylistic deficiencies of existing formatting. For example, headings and single-cell tables with excessively long text are replaced, respectively, by non-heading text and by non-table text and forms are not reproduced on reformatted page. The reformatted principal item replaces the original view of page content that is displayed to a page visitor in a browser. Clicking on a button or pressing a dedicated keyboard key returns the original page view.

The system described herein facilitates clipping of portions of principal item for storing in personal databases, such as Evernote notebooks. In one embodiment, a visual clipping is applied to extracted principal page items based on a simple interactive drawing. Whenever a vertical or nearly vertical line interval or a bracket (drawn as one continuous stroke) is drawn along a margin of a displayed principal item, all lines of content whose horizontal boundaries are located within the interval are selected. When a user crosses out any interval, the system deletes that selection fragment. A check mark, button click or a dedicated multi-touch gesture completes selection and clips all selected lines into a personal database.

BRIEF DESCRIPTION OF THE DRAWINGS

Embodiments of the system described herein will now be explained in more detail in accordance with the figures of the drawings, which are briefly described as follows.

DETAILED DESCRIPTION OF VARIOUS EMBODIMENTS

The system described herein provides methods for extracting relevant principal information from a Web page, presenting such information to a page visitor in viewer-friendly format, and facilitating selection and memorizing of such information or portions thereof in personal, corporate and/or public databases. The system relies on a sequence of cleaning, ranking and formatting operations based on heuristics that emerged from experimental analysis and formal research and proved to work well with numerous real-life Web pages. At each step, page analysis is conducted pertaining to page elements (HTML tags) and their structure, subordination and mutual disposition within the page. Presence and volume of text and links, measured in characters, words, and several special types of paragraphs is calculated, as well as number, location, and size of images and other types of page contents.

The system described herein uses a multiplicative model for calculating scores of qualifying elements on the page, deemed herein "Containers", and subset thereof deemed "Candidates", as explained elsewhere herein. Candidates are ranked by scores and a principal page item with a top score is chosen among the Candidates. A stop rule is subsequently applied, which may terminate search of the best Candidate or justify another round of ranking that may alter the principal item or suggest a different Candidate which is then compared with the original top score candidate in a separate step of the ranking process.

After the principal item (top score Candidate) is chosen, the item is cleaned from unnecessary elements such as floating panes, supplementary text boxes, video clips from unknown sources, etc. Page space above the item is searched for material potentially missing in the original item, such as the header, sub-header, author, publication date and similar information. A search for multi-page content of the principal item is also conducted. Subsequently, the principal item is formatted in a reader-friendly manner and displayed to the page visitor (user operating a browser to view the page).

Figure 1A:
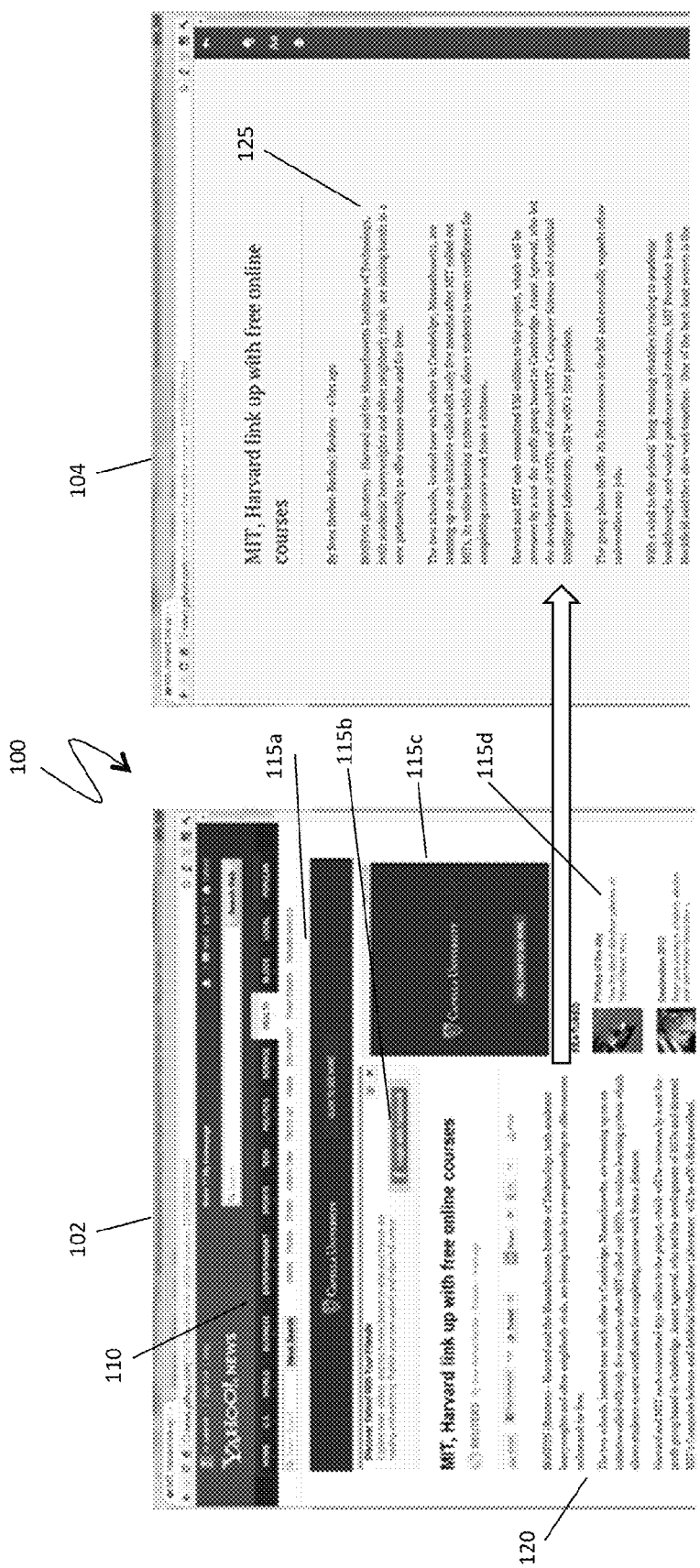
FIG. 1 shows an original Web pages and a Web page in which the principal item has been identified, extracted, cleaned up, reformatted and displayed according to the system described herein.

FIG. 1A is an illustration 100 of various results of extraction of principal items from Web pages. In FIG. 1A, a principal item shown on a Web page 102 is an article 120, wrapped into multi-level site navigation system represented by a toolbar 110. Additionally, multiple promotional and advertising elements 115a-115d are added to the page. According to the system described herein, principal content is extracted, reformatted for best viewing experience and displayed to page visitor as refined article 125 in a separate browser window 104.

Figure 1B:
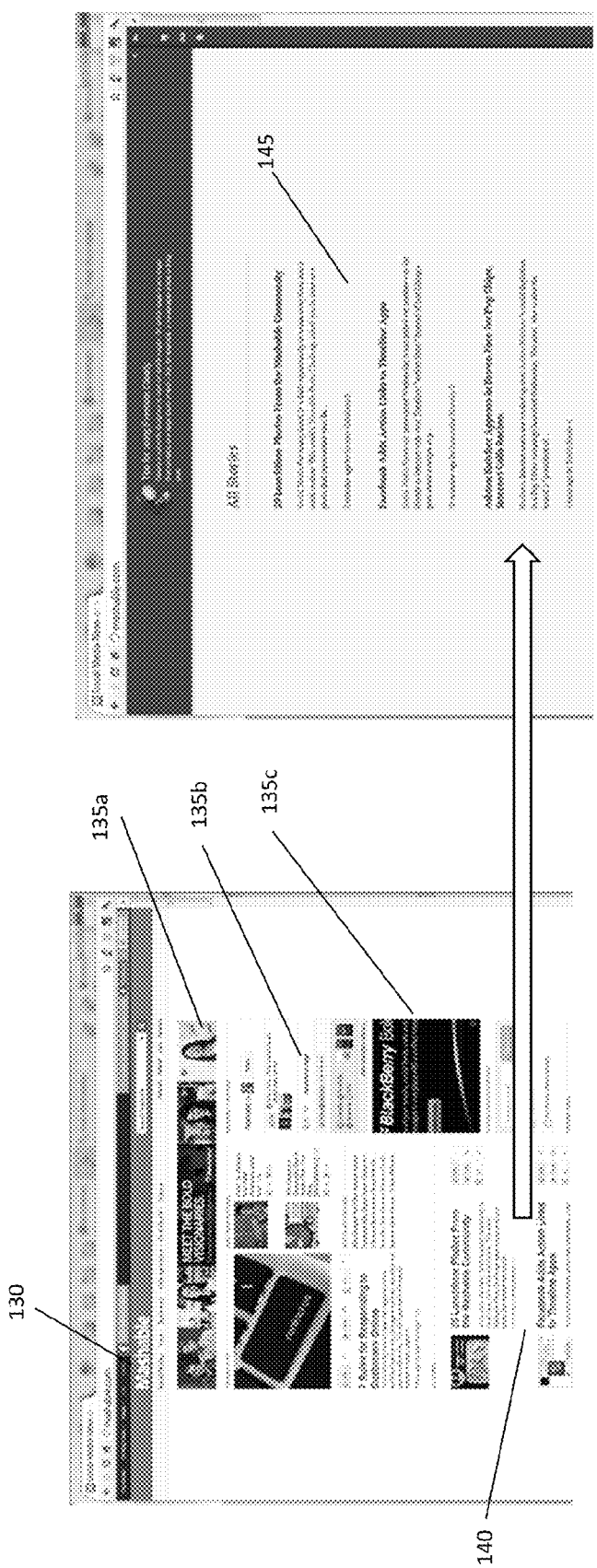

In FIG. 1B, the principal item 140 of a Web page represents a list of article headings from a front page of a technology news site. The list 140 occupies relatively small space on the front page, accompanied by site navigation 130, advertising content 135a-135c and other items. According to the system described herein, principal content is extracted, cleaned up, re-formatted and displayed as list of headings 145 in a separate pop-up browser window.

Figure 1C:
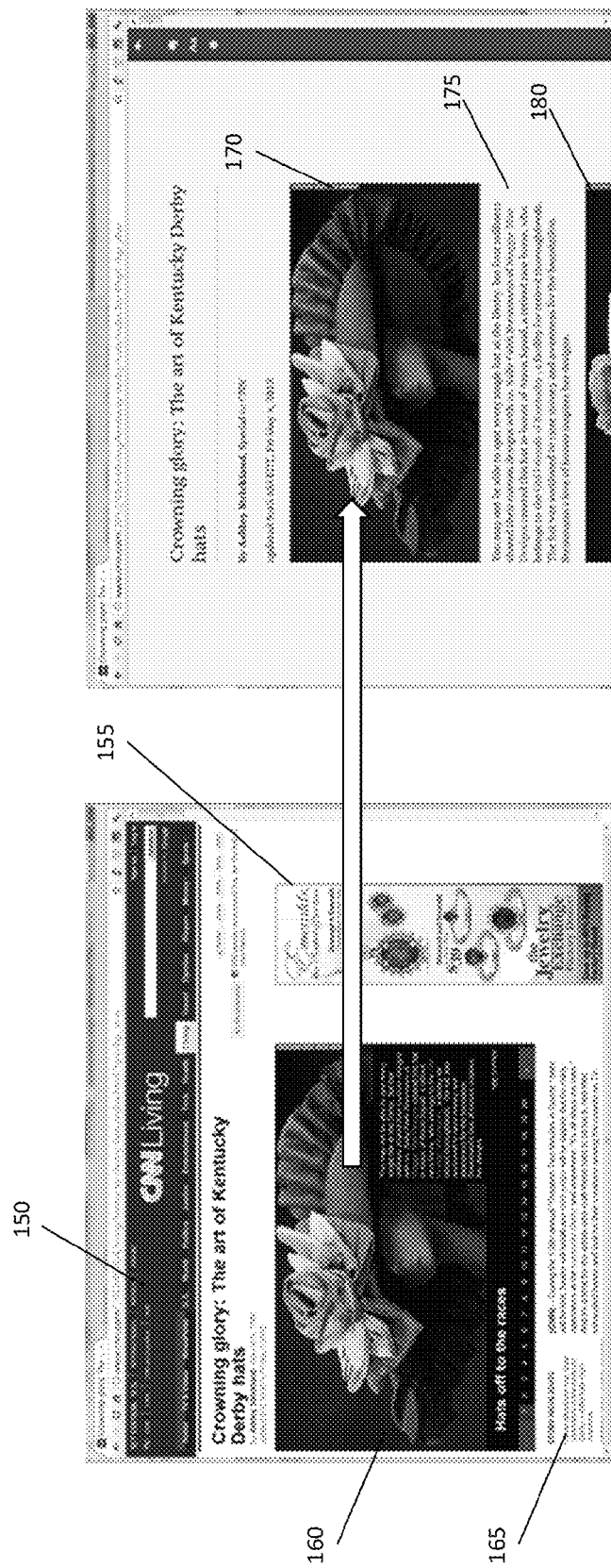

In FIG. 1C, principal item is an article 165, which starts with a slide show 160 overlaid on top of an image. As on previous figures, the principal item is supplemented with a site navigation system 150 and an advertising banner 155. The system described herein extracts principal page items from the article, cleans up the article from text overlay and slide show navigation and shows article text 175 with a top image 170 and additional images (such as an image 180) in a separate browser window in user-friendly formatting. Long block-arrows on FIGS. 1A, 1B and 1C are for illustration purpose only and are not provided on the Web pages.

Figure 2:
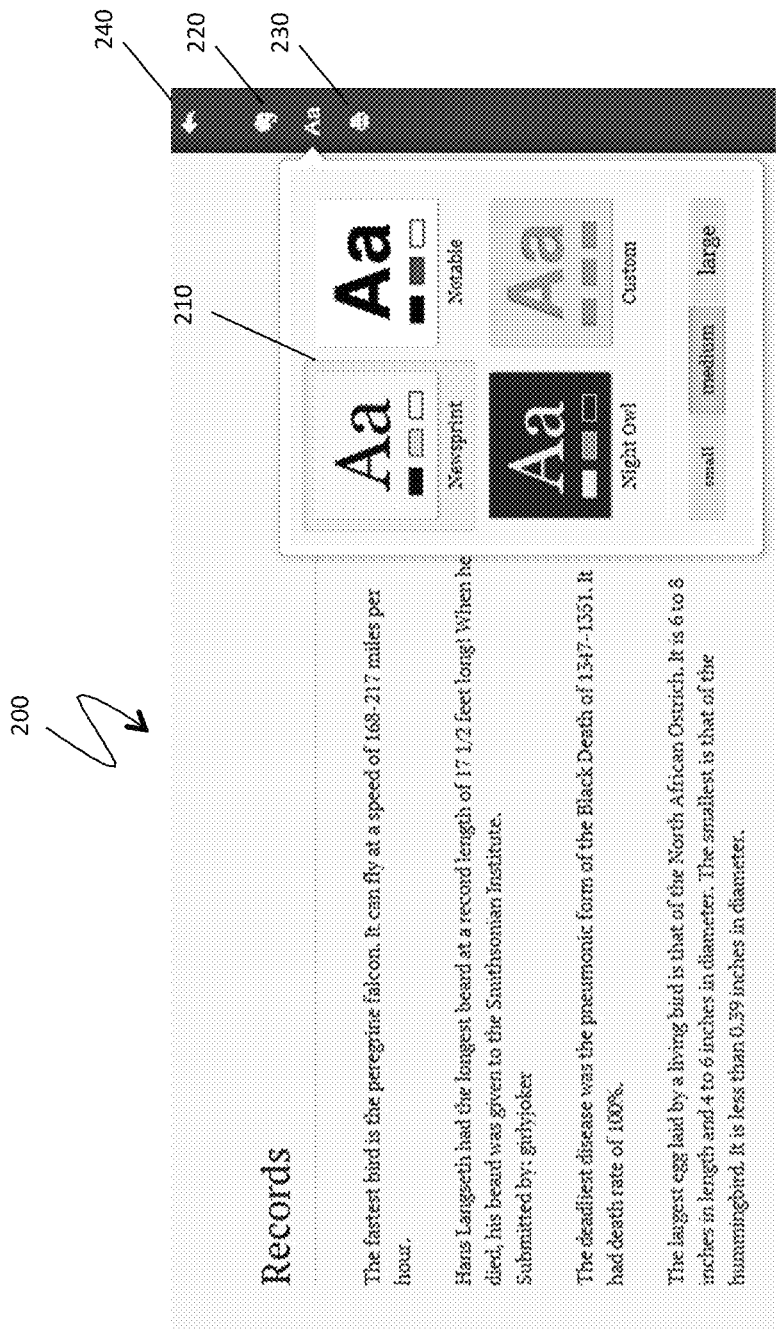
FIG. 2 is an illustration of diverse options of displaying, clipping and printing of an extracted principal page item according to the system described herein.

FIG. 2 is an illustration 200 of an embodiment of the system where display and other options are presented to page visitor after extracting a principal item and displaying the principal item in a pop-up browser window. A user may choose font size, appearance and background from a pane 210 or define custom appearance by choosing customization option from the pane 210. Additionally, the user is presented with a clipping option 220 and a printing option 230, while a back option 240 closes the pop-up window with the extracted principal item and returns the user to the original Web page.

Figure 3A:
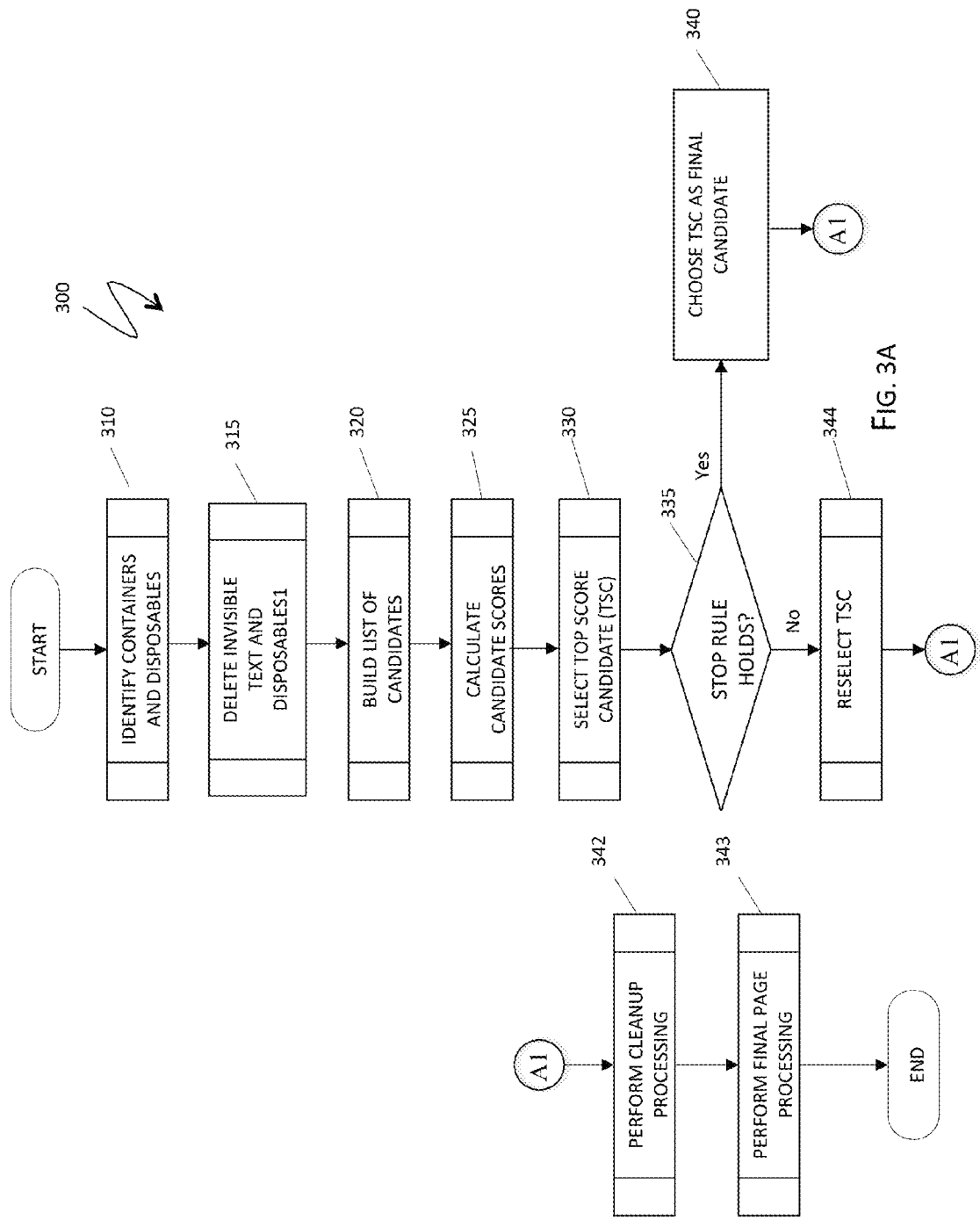
FIGS. 3A-3D are flow diagrams showing pre-processing of a Web page and displaying a principal page item with optional clipping of the item or a portion thereof into personal database according to the system described herein.

FIG. 3A is a flow diagram 300 showing processing in connection with extraction of principal item from Web page according to an embodiment of the system described herein. Processing begins at a step 310 where source code of Web page is parsed and where Containers and Disposables are identified. At the step 310, Web page elements (HTML4 and HTML5 tags) are grouped into a few (generally, intersecting) classes; elements of each class are processed differently during identification of principal page items. These classes include Containers, which are associated with tags 'body', 'div', 'td', 'li', 'article/section' (HTML5). In some embodiments, only Containers (with some potential additions explained elsewhere herein) may be chosen as the final result. Other classes of Web page elements may have an opposite role compared with Containers. For example, Disposables 1, 2, 3 identify page elements that are to be cleaned off immediately (Disposables1), deleted from the principal item once the principal item is chosen (Disposables2), and cleaned off above the identified principal item, i.e. closer to page top (Disposables3). Disposables1 include tags 'button', 'input', 'select', 'textarea', 'command', 'frame', 'style', 'link', 'script', etc. Disposables2 include floating elements with otherwise legitimate tags—specifically, 'div' and 'table'. Disposables3 include line break 'br' and list tags—'ul', 'ol', 'dl'.

It should be noted that page clean-off may be applied incrementally. Accordingly, some disposable tags may be excluded at the first step, since the first list corresponding to Disposables1 items may be significantly longer than two other lists for Disposables2 and Disposables3. Another class of elements may be formed by tags that include text which has been made invisible to page visitor and also has to be dropped at start. Tags that require a check for such text visibility include 'article/section' (available in HTML5), 'ul', 'ol', 'li', 'dd', 'table', 'tr', td', 'div', and headings 'h1' and other.

After the step 310, processing proceeds to a step 315, where page text made invisible to a user by page designer or/and publisher is identified and deleted from the page and where, additionally, Disposables1 are also removed. After Disposables1 have been cleaned off and Containers have been identified, Candidates for the position of principal page item are chosen among those Containers. In order for a Container to qualify as a Candidate for subsequent ranking, it needs to satisfy two requirements, as follows:

(i) The Container includes certain minimal amount of regular text, measured in characters and in words. In one embodiment of the system described herein, two empiric constants, 195 characters and 37 space-delimited words, are used as a minimum size criteria for a Container to be treated as a Candidate; and (ii) Text in the Container prevails over links so that only Containers that have more words in regular text than there are distinctive links in a Container are included in the Candidate list.

After all Candidates are identified, the system determines Candidates that do not include other Candidates, which are deemed "Pieces". Pieces are leaves of a tree of Candidates that is partially ordered by inclusion.

A mechanism is provided for estimating a number of words for international Web pages where significant portion of page content or all content are presented in hieroglyphic and other languages where explicit space-based word split may be absent. For such pages, punctuation signs may be identified and used to estimate the number of words via linear method. In one embodiment, each punctuation sign may be assigned a weight calculated statistically on a large corpus of text in the language in question. The weight reflects an average number of words from a previous sign or beginning to a current sign. Regular text of a Container is scanned and weights for all subsequent punctuation signs are summed up resulting in an estimated word count. For example, the punctuation sign of enumeration comma (u3001 in Unicode 6.1, with graphical sign ') has a weight of one, since the enumeration comma normally separates adjacent single words. A full stop sign (u3002°), on the other hand, has a weight of four, reflecting an average number of words in a phrase of common text.

After the step 315, processing proceeds to a step 320, where a list of Candidates is built from the previously identified Containers. A length of regular text (not counting links) in each of the Candidates, measured both in characters and in directly counted or estimated number of words, serves as a primary characteristic from which four different paragraph counts are derived. The different paragraph counts include the number of three-line paragraphs, the number of five-line paragraphs, the number of 50-word paragraphs, and the number of 80-word paragraphs. In an embodiment herein, identification of a paragraphs is not based on any special paragraph sign or other literal separator. Rather, paragraphs are artificial constructions based on a number of lines and a number of words. In one embodiment, the line count may be based on an N-character line so that a block of text having M characters is an M/N line paragraph. In an embodiment herein, different units and numbers thereof may be used so that, for example, the system may count words and determine the number of eighty word and fifty word paragraphs as well as the number of three line and five line paragraphs.

Additionally, the system takes into account a number of images of large and small size, as well as skipped images. In one embodiment, large images contain at least 50K pixels or have a width of at least 350 pixels and a height of at least 75 pixels and medium images contain at least 20K pixels or are larger than 150×150 pixels. Skipped images either have a size not exceeding 5×5 or are present on Web page as references to blacklisted and/or otherwise quarantined domains. Any other image is considered Small.

After the step 320, processing proceeds to a step 325, where scores are calculated for all Candidates. An Initial Score of each Candidate may be calculated as a weighted sum of counts of the Candidate's paragraphs and images, multiplied for convenience by one thousand. In an embodiment herein, the following may be used for determining the initial score:

$$\text{Initial Score} = 1000 \times (1.5 \times (N_{5\text{-}line\text{-}paragraphs} + N_{80\text{-}word\text{-}paragraphs}) + N_{3\text{-}line\text{-}paragraphs} + N_{50\text{-}word\text{-}paragraphs} + 3 \times N_{large\text{-}images} - 0.5 \times (N_{small\text{-}images} + N_{skipped\text{-}images}))$$

Calculation of the Initial Score in the above formula illustrates building heuristics for extracting principal content from Web pages that may be used throughout other embodiments of the system described herein. Where certain parameters are evidencing in favor of important, principal nature of a Candidate the parameters are added to enhance the score with weights reflecting the parameters empirically derived degree of importance. On the other hand, where other parameters demonstrate an unimportant, secondary nature of a Web page item, the parameters are subtracted and weighted so as to lessen the overall score. The above formula for initial score provides that more regular text and large images evidence in favor of a principal item while more small or skipped images evidence against a principal item.

The initial score may then be adjusted. In one embodiment of the system, Normalized Piece Count $N_{Pieces}$, Normalized Candidate Count $N_{candidates}$ and Normalized Containter Count $N_{containers}$ may be calculated using the following formulas:

$$N_{Pieces} = \text{Max}(5, \text{total number of Pieces}/4)$$

$$N_{Candidates} = \text{Max}(5, \text{total number of Candidates}/4)$$

$$N_{Containers} = \text{Max}(10, \text{total number of Containers}/4)$$

The ratios calculated above may be rounded down to the nearest integer score. Subsequently, a Modified Initial Score may be calculated using as follows:

$$\text{Modified Initial Score} = \text{Initial Score} \times (\tfrac{1}{2} + \tfrac{1}{2} \times \tfrac{1}{3} \times (1/N_{Pieces} + 1/N_{Candidates} + 1/N_{Containers}))$$

The formula for the Modified Initial Score illustrates an incremental modification of Candidate scores that takes into account additional parameters of a Web page. A portion of the Initial Score value (in this case, 50%) remains untouched, while the remaining portion is modified using diverse ratios, which are averaged in this embodiment. A similar approach may be subsequently applied to further modifications of the Candidate scores at the first phase and, if necessary, at additional phases of identification of the principal page item.

The above embodiment of the formula for a Modified Initial Score applies to the first phase of identification of a top score candidate for a principal page item. Coefficients used in the formula may be modified, as explained elsewhere herein.

A sequence of ratios may be calculated for a Candidate. In one embodiment, ratios may reflect text and link density, subordination of Candidates and other parameters of Candidate as shown in the first column of the table below. Other columns of the table are explained elsewhere herein.

Use of Ratios in Calculating Candidate's Score

| Ratio | Direct/Inverse (ratio/1-ratio) | Percent at phase 1 | Percent at phase 2 | Percent at phase 3 | Degree at phase 1 | Degree at phase 2 | Degree at phase 3 |
|---|---|---|---|---|---|---|---|
| Length of regular text (Candidate/Total) | D | 90 | 50 | 25 | 2 | 1 | 1 |
| Number of words in regular text (Candidate/Total) | D | 90 | 50 | 25 | 2 | 1 | 1 |
| Length of regular text above Candidate/Total length of regular text | I | 90 | 90/50 * | 50 | 5 | 1 | 1 |
| Number of words in regular text above Candidate/Total number of words in regular text | I | 90 | 90/50 * | 50 | 5 | 1 | 1 |
| Length of regular text above Candidate/Length of regular text within Candidate | I | N/A | 90/50 * | 90 | N/A | 1 | 1 |
| Number of words in regular text above Candidate/Number of words in regular text within Candidate | I | N/A | 90/50 * | 90 | N/A | 1 | 1 |
| Length of text in links/Length of regular text (Candidate; set to 1 if >1) | I | 50/25 * | 50/25 * | 50 | 1 | 1 | 1 |
| Number of words in links/Number of words in regular text (Candidate; set to 1 if >1) | I | 50/25 * | 50/25 * | 50 | 1 | 1 | 1 |
| Length of text in links/Total length of text (Candidate/Total) | I | 50/25 * | 50/25 * | 50 | 1 | 1 | 1 |
| Number of words in links/Total number of words (Candidate/Total) | | 50/25 * | 50/25 * | 50 | 1 | 1 | 1 |
| Length of text in links/Total length of text in links (Candidate/Total) | I | 25 | 25 | N/A | 1 | 1 | 1 |
| Number of words in links/Total number of words in links (Candidate/Total) | I | 25 | 25 | N/A | 1 | 1 | 1 |
| Number of links (Candidate/Total) | I | 25 | 25 | N/A | 1 | 1 | 1 |
| 2 x Number of links/Number of regular words (Candidate; set to 1 if >1) | I | 50/25 * | 50/25 * | 50 | 1 | 1 | 1 |

-continued

|  | Direct/Inverse | Percent at phase | | | Degree at phase | | |
| --- | --- | --- | --- | --- | --- | --- | --- |
| Ratio | (ratio/1-ratio) | 1 | 2 | 3 | 1 | 2 | 3 |
| Number of embedded Candidates (Candidate/Total) | I | 25 | 90 | 50 | 1 | 2 | 1 |
| Number of embedded Pieces (Candidate/Total) | I | 25 | 90 | 50 | 1 | 2 | 1 |
| Number of embedded Containers (Candidate/Total) | I | 25 | 90 | 50 | 1 | 2 | 1 |

* Second number is for CJK (Chinese, Japanese, and Korean) languages

The ratios may be incrementally applied to the Modified Initial Score by multiplying the percentage of the current value of the Modified Initial Score indicated in the third column of the table ("Percentage at phase 1") either by the original ratio or by the "inverse" value (1-ratio), as indicated in the second column of the table (Direct/Inverse ratio), taken in certain degree indicated in the column six of the table (Degree at phase 1). A rule for using direct or inverse values of ratios may be as follows: when a higher value of a ratio correlates with increased suitability of the Candidate (for example, the denser the regular text the higher the chance of Candidate being an article rather than a navigation pane or a link box) then the ratio is multiplied directly by the score or by a portion of the score (the rest of the score remains unchanged). In contrast, when a lower value of the ratio indicates in favor of the Candidate then the inverse (1-ratio) multiplier is used. Thus, the lower the density of links, the more the Candidate is looking like a solid article, rather than a link box with resources or a navigation panel. Therefore, the ratio of the Candidate is applied inversely, i.e. a portion of the current score is multiplied by (1-ratio) while the rest of the current score remains unchanged. After the multiplication has been done, the rest of the previous current value (100—value in the third column) is added to the product and forms new current value of Modified Initial Score. Therefore, the formula for changing the modified initial score after applying n-th ratio from the table is as follows:

$$\text{Modified Initial Score}_{n+1} = \text{Modified Initial Score}_n \times (\text{Percentage}_n \times (\text{ratio}^{degree})_n + (100 - \text{Percentage}_n))/100$$

After the step 325, processing proceeds to a step 330, where TSC, the Top Score Candidate, is selected based on previous score calculations. After the step 330, processing proceeds to a test step 335, where a Stop Rule is applied to determine if the TSC may be chosen as the final Candidate for the principal Web page item. The stop rule is applied to check if the TSC is a final choice of the principal item on the page or additional ranking and validation phases are needed. In one embodiment herein, the stop rule allows using the TSC as the final choice for the principal item on the page if one of the following conditions holds:

(1) The TSC includes less than 25 embedded Containers (including the case when the TSC has no Containers at all).

(2) The TSC does not include embedded Candidates (although the TSC may have other Containers which do not satisfy the definition of being a Candidate).

(3) The TSC includes no more than three embedded Candidates that have other embedded Candidates inside.

If the Stop Rule holds, then, after the step 335, processing proceeds to a step 340, where the TSC is declared the final Candidate. Following the step 340 is a step 342 where the TSC is cleaned up by removing unnecessary elements included in Disposables2 and 3, such as floating elements, link boxes, navigation panels, videos from unknown sources and scanning text above the TSC to determine if a header, a sub-header author or publication day info for the TSC has been missed at identification step. If missing header/sub-header/author/publication date are found the missing element(s) are added to TSC. Cleaning the TSC may also include reformatting the TSC by rewriting the text thereof as a new HTML page using only feasible HTML tags and attributes and ignoring certain stylistic deficiencies and unnecessary elements in the original page format (for example, headings and single-cell tables with excessively long text are replaced with regular non-heading and non-table text, forms are not reproduced on the resulting page, etc.). After the step 342, processing proceeds to a step 343 where final page processing is performed. Final page processing at the step 343 is described in more detail elsewhere herein. Following the step 343, processing is complete.

If the Stop Rule fails at the step 335, then processing proceeds to a step 344, where the TSC is reselected (i.e., a new TSC is possibly selected). Reselecting the TSC at the step 344 is described in more detail elsewhere herein. Following the step 344, control transfers to the step 342, described above, where cleanup processing is performed and the step 343, described above, where final page processing is performed. Following the step 343, processing is complete.

Figure 3B:
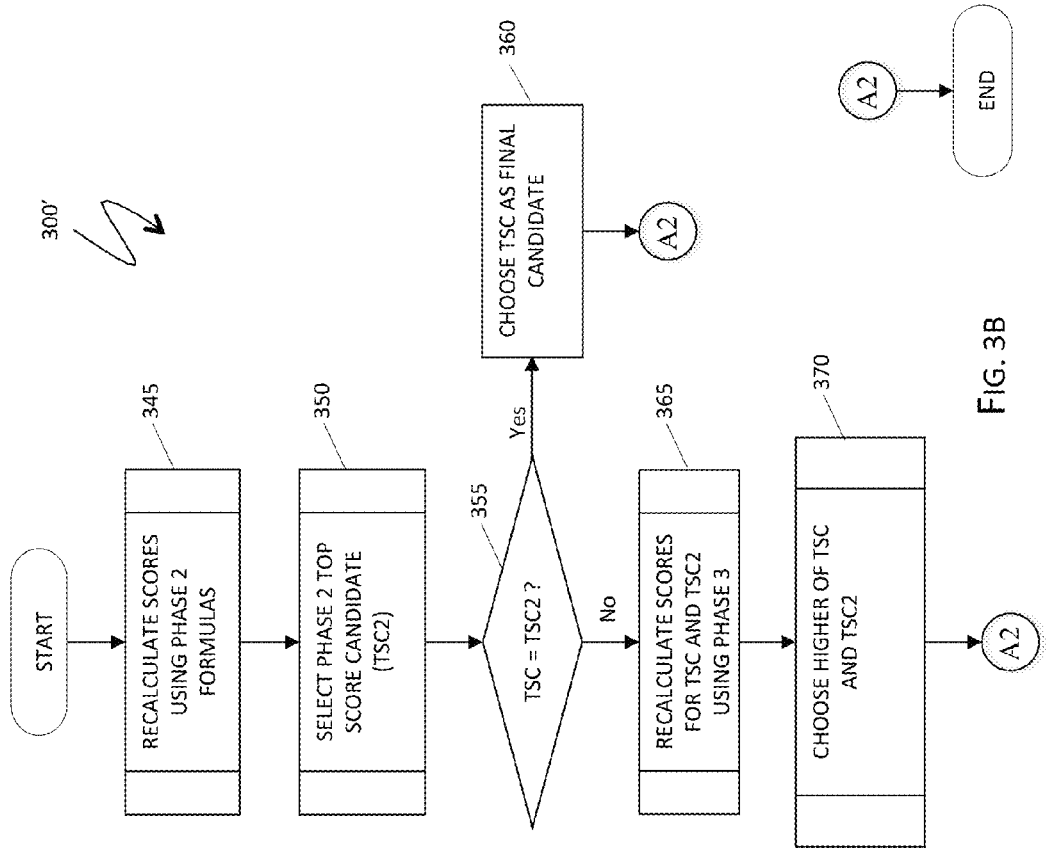

FIG. 3B is a flow diagram 300' illustrating in more detail reselection of TSC provided at the step 344 of the flow diagram 300 of FIG. 3A and applied in the event that the stop rule at the step 335 does not hold. Processing begins at a step 345 where scores for the original set of Candidates is recalculated using modified formulas of phase 2 of the process. At the step 345, all of the Candidates are re-ranked using the mechanism described above with the following modifications:

(a) The formula for the Modified Initial Score is altered as follows:

$$\text{Modified Initial Score} = \text{Initial Score} \times (\tfrac{1}{3} + \tfrac{2}{3} \times \tfrac{1}{3} \times (1/N_{pieces} + 1/N_{Candidates} + 1/N_{Containers}))$$

(more weight is given to modifications and smaller portion is left unchanged, compared with phase 1)

(b) Ratios from the table above are used with percentages and in degrees corresponding to phase 2 (respectively, columns 4 and 7, "Percentage at phase 2" and "Degree at phase 2" from the table). It should be noted that two additional ratios are added at phase 2, defined by line items five and six of the table (N/A's on phase 1).

After the step 345, processing proceeds to a step 350, where a new Top Score Candidate TSC2 based on new scores is identified. TSC2 may or may not be the same as the Top Score Candidate TSC chosen at phase 1. Therefore, after the step 350, processing proceeds to a test step 355, where it is determined whether phase 2 resulted in the same best Candidate, i.e. whether TSC and TSC2 is the same Candidate. If TSC=TSC2, then, after the step 355, processing proceeds to a step 360, which is similar to the step 340, discussed above, where TSC is declared the final Candidate. After the step 360, processing is complete (and control returns to the step 342, discussed above).

If it is determined at the step 355 that phase 1 and phase 2 have resulted in different Top Score Candidates TSC and TSC2, then, after the step 355, processing proceeds to a step 365, where scores for the two top Candidates TSC and TSC2 are re-calculated once again using modified formulas of Phase 3. Modified Initial Scores for TSC and TSC2 are determined using the modified formulas described above in connection with phase 2, and ratios (portion of ratios used at phases 1 and 2) are applied using values from the phase 3 columns of the table, namely, columns five and eight, "Percentage at phase 3" and "Degree at phase 3".

After the step 365, processing proceeds to a step 370, where the higher scoring Candidate among TSC and TSC2 is chosen as the final Candidate. After the step 370, processing is complete (and control transfers to the step 342, described above.

Figure 3C:
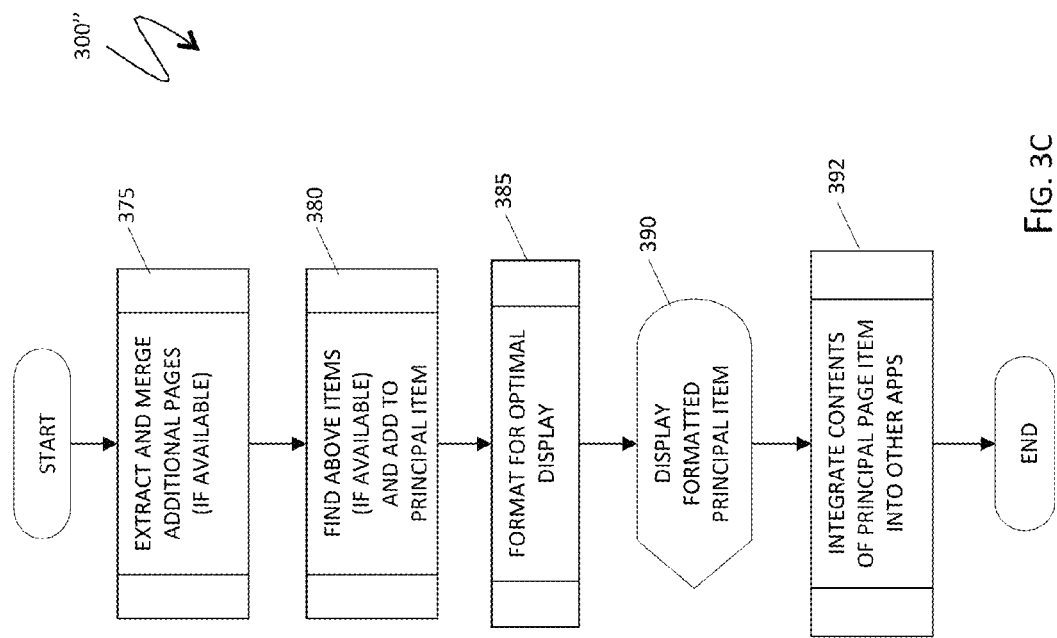

Referring to FIG. 3C, a flow diagram 300'' shows in more detail final page processing at the step 343, described above. Processing begins at a first step 375, where multi-page content of the principal page item is detected (if available). Processing provided at the step 375 is discussed in more detail elsewhere herein. After the step 375, processing proceeds to a step 380, where text above the principal page item is searched for potentially missing title/author/date information. If found, such information is added to the top of the principal page item. After the step 380, processing proceeds to a step 385, where the principal page item is formatted for optimal user-friendly display. Processing at the step 385 may include reformatting the TSC by rewriting the text thereof as a new HTML page using only feasible HTML tags and attributes and ignoring certain stylistic deficiencies and unnecessary elements in the original page format (for example, headings and single-cell tables with excessively long text are replaced with regular non-heading and non-table text, forms are not reproduced on the resulting page, etc.).

After the step 385, processing proceeds to a step 390, where a formatted principal page item is displayed to user in a separate pop-up or other browser window. In one embodiment, the pop-up window may be supplied with controls facilitating interaction with a browser or an application like Evernote. In another embodiment, such controls may include additional formatting options. Note that the display window may include controls, allowing user to alter display settings or define completely custom display options, such as in FIG. 2.

After the step 390, processing proceeds to a step 392, where the user may optionally integrate content of principal page item into other applications. In one embodiment, such integration includes selective or full clipping of principal page item into personal, shared or public database, such as Evernote notebooks. A visual clipping method may be used to select portions of extracted principal page item and clip content thereof into memorizing applications. Whenever a vertical or nearly vertical line interval or a bracket (drawn as one continuous stroke) is drawn on the left or the right margin of displayed principal item, all lines of content having horizontal boundaries that cross the interval are selected. In this way, non-adjacent selections are easily available, unlike traditional selection where edit cursor driven by mouse or touch events is utilized. Crossing out any interval deletes a selection fragment which subsequently disappears from view. A check mark, button or multi-touch gesture may complete selection and cause clipping of all selected lines into memorizing application. After the step 392, processing ends.

Figure 3D:
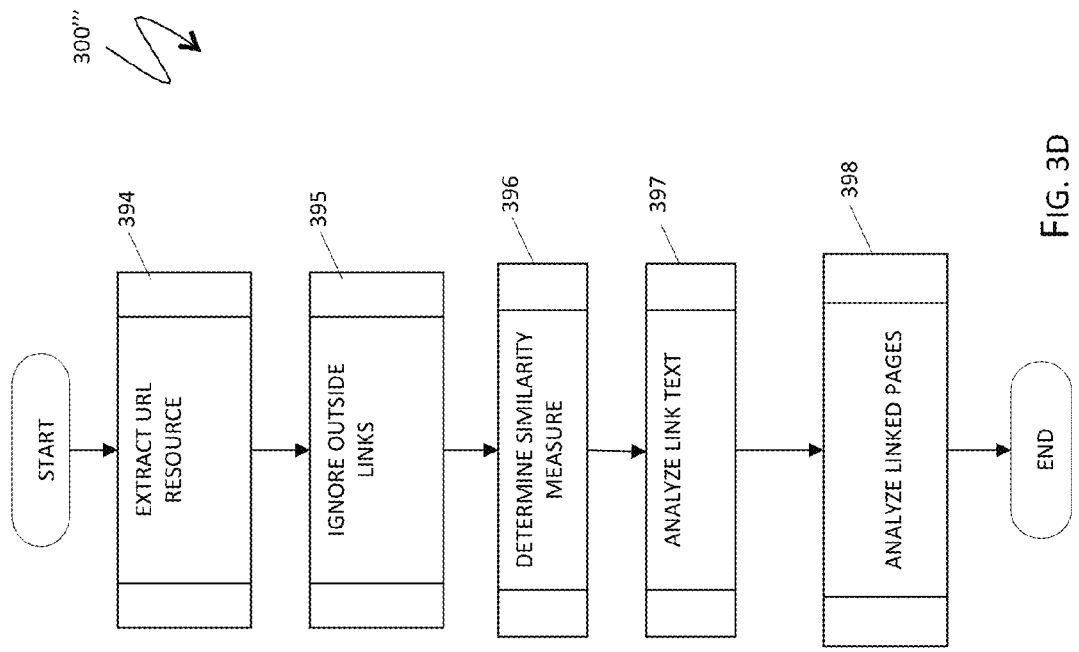

FIG. 3D is a flow diagram 300''' illustrating in more detail processing performed at the step 375, discussed above, where additional pages are extracted and merged. Processing begins at a step 394 where, for the original page URL, the last non-empty segment of the path of the URL (deemed the "resource" of the URL) is extracted. The non-empty text is text after the last slash sign '/' or between the two last slash signs in the URL, stripped from query string and fragment identifier when present (see IETF RFC 3986, http://www.ietf.org/rfc/rfc3986.txt).

Following the step 394 is a step 395 where all links on the page that do not lead to the same domain as the original page are ignored. The system described herein does not attempt to identify multi-page articles distributed between different Web sites. For each remaining link, the last non-empty segment of the path of the URL (the resource) is also extracted from the path similarly to the step 394.

Following the step 395 is a step 396 where similarity measure (such as edit distance—in one embodiment of the method, Levenstein's distance; in another embodiment—length of Largest Common Substring) between the resource of the original URL and each of the resources of the links is calculated, normalized and sorted in descending order. All links within certain similarity threshold (in one embodiment, measured at 90% to 60% with 10% decrements, whichever threshold has available links) are retained for subsequent analysis. All other links are abandoned.

Following the step 396 is a step 397 where, for the remaining links, the link text is analyzed for the presence of the word "next" (in multiple languages) or the text representing numbers, such as "2", "3", etc., which is a common style for indicating multiple pages. If such text is absent, a search for the word "next" and for text representing numbers is performed in link title and/or in image's 'alt' tag if the linked object is an image. In one embodiment, OCR (Optical Character Recognition) is used to identify page numbers and/or the word "next" in linked images. Links where the word "next" or numeric-only text is identified are retained, while other links are ignored. A position of retained links vs. principal page item is checked. If links are near the bottom or the top of the principal item they are further promoted, otherwise, the links are dismissed.

Following the step 397 is a step 398 where Web pages referred by retained "next" links are loaded, principal page items on those pages are detected as explained above, and additional checks are applied to verify that the extracted principal items are consistent with the original page. In one embodiment, an article title extracted from additional page(s) is compared with the original page title (the article title may be replicated on all the pages). If consistency is confirmed, an additional principal item (without title) is merged with the previously extracted pages of the article.

Note that the processing for the flow chart 300''' may be repeated for all subsequent pages of an article (for example, when the principal item from page 2 of an article is merged with the principal item of the original page, the "next" link or the link text "3" is searched on page 2). The cycle continues until there are no more new pages to analyze.

Note also that a validity check may be performed for multi-page items. In particular, multiple pages of comments, appended to an article, as opposed to multi-page article text, are identified and comments are erased while article text is retained.

Additional pages of principal page item that are identified (if any), are cleaned up and merged with the principal page item.

Figure 4:
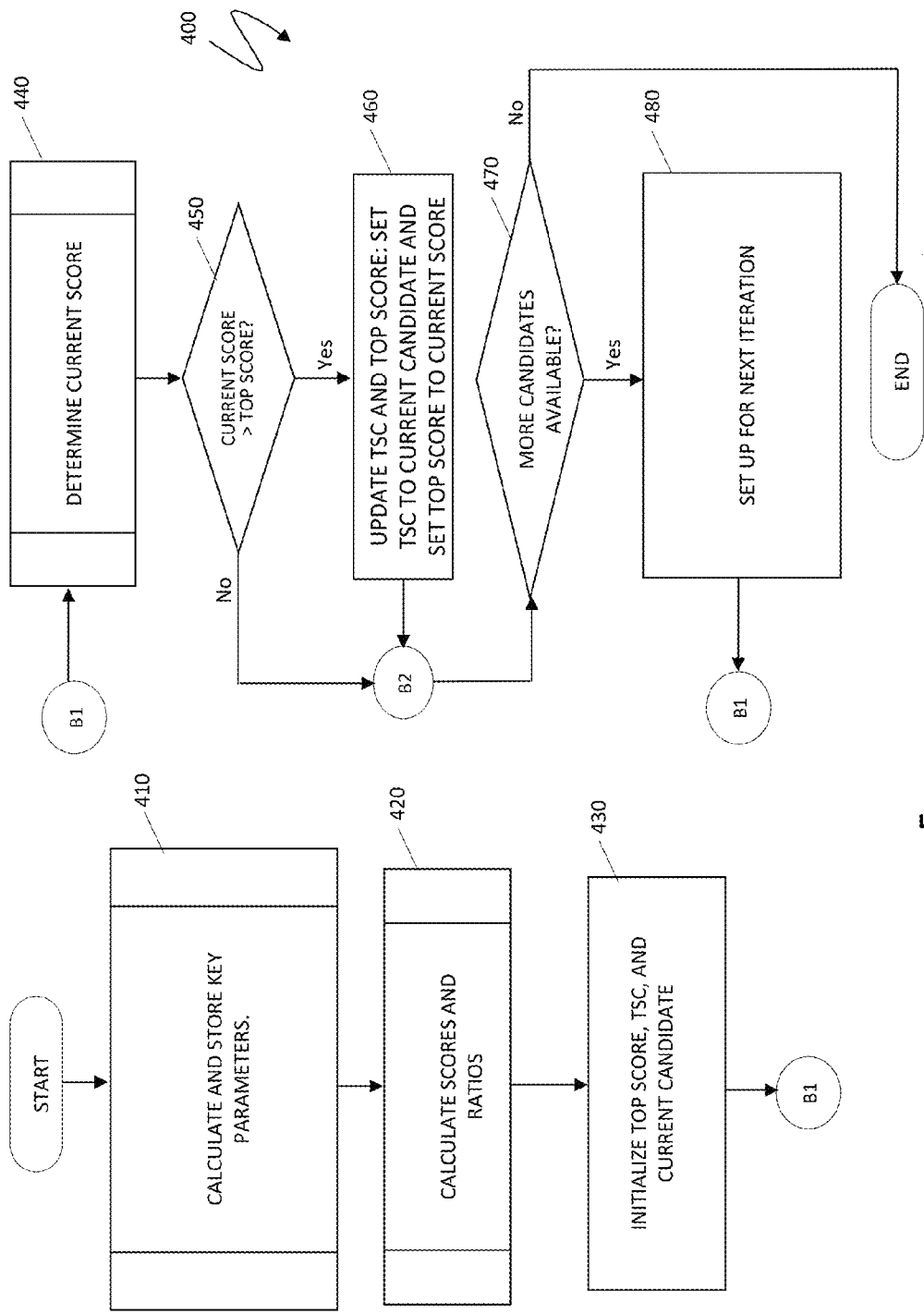
FIG. 4 is a flow diagram illustrating calculating scores and ranking of Candidates according to the system described herein.

FIG. 4 is a flow diagram 400 showing in more detail processing performed at the step 325, discussed above, in connection with calculating Candidate scores at the phase 1 cycle of extraction of the principal page item, according to an embodiment of the system described herein. Processing begins at a step 410 where key parameters of Candidates are calculated and stored. The key parameters include text and word length and count inside and above Candidates, both in regular page text and in links as well as the number of small, medium and large images. Links to outside images are analyzed. Subsequently, paragraph counts for different type of conditional paragraphs are derived from calculated parameters, as explained elsewhere herein. The values calculated at the step 410 are calculated only once and stored with each Candidate.

After the step 410, processing proceeds to a step 420, where Initial Scores, Modified Initial Scores, and ratios for phase 1 from the table are calculated for each Candidate. The values at the step 420 can be calculated and stored once. After the step 420, processing proceeds to a step 430, where phase 1 of identification process for a principal Web page item is initialized. At the step 430, the Top Score is set to zero for future modifications, and Top Score Candidate (TSC) and Current Candidate are both set to first Candidate on the list. After the step 430, processing proceeds to a step 440, where Modified Initial Score is retrieved for the Current Candidate and ratios are incrementally applied to that score, according to the table 1, as described above, resulting in the Current Score.

After the step 440, processing proceeds to a test step 450, where the Current Score is compared with the Top Score. If the Current Score does not exceed the Top Score, then, after the step 450, processing proceeds to a test step 470, where the list of Candidates is checked for the presence of additional Candidates. If at the step 450 the Current Score exceeds the runtime value of the Top Score, then, after the step 450, processing proceeds to a step 460, where the TSC and the Top Score are updated. At the step 460, TSC is set to the Current Candidate and the Top Score is set to the Current Score. After the step 460, processing proceeds to the test step 470, where it is determined whether more Candidates are available on the list. If there are more Candidates, then, after the step 470, processing proceeds to a step 480, where the system prepares for the next iteration. At the step 480, the Current Candidate is set to the Next Candidate on the list, while the Current Score is set to the Current Candidate's Initial Score. After the step 480, processing returns to the step 440, discussed above, for the next iteration. If it is determined at the step 470 that there are no more Candidates on the list, then all Candidates have been already scored and ranked. In such a case, processing stops, leaving the TSC and Top Score at the most recently updated values.

Figure 5:
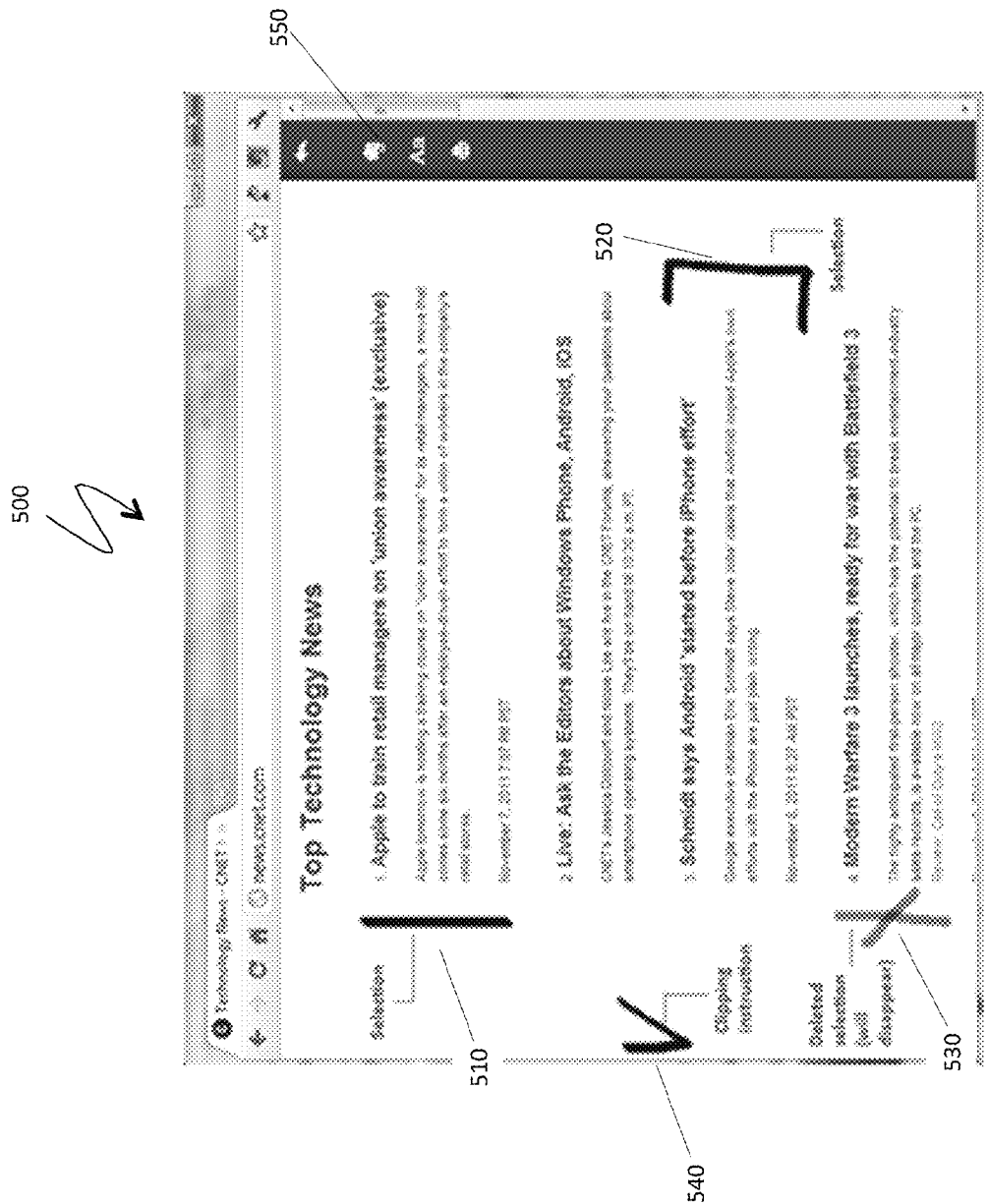
FIG. 5 is a schematic illustration of visual clipping of portions of a principal page item into a personal database according to the system described herein.

FIG. 5 is a schematic illustration of advanced yet user-friendly visual selection of fragments of principal page item for integrating content thereof into other applications, as explained at the step 395 of the flow diagram 300", above. Whenever a user draws a vertical or a nearly vertical line 510 or bracket 520 on page margins using a pen, mouse or finger, depending on the input capabilities of computer or mobile device, such hand drawn line or bracket is recognized as a selection marker. All lines of text of the principal page item having horizontal positions that intersect with the selection marker are marked selected and added to a previous selection. Whenever a selection marker is crossed by a diagonal line, as shown at a fragment 530, such diagonal line is recognized and the marker is deemed deleted. In one embodiment, the selection marker disappears after the pre-defined timeout. In another embodiment, the selection marker appears faded. In different embodiments, prior selection markers are forgotten after deletion or can be recalled (the deletion can be undone and redone). The effect of deletion of a selection marker is de-selection of all lines of the principal page item having vertical coordinates that are intersecting with deleted selection marker and are not intersecting with any active, non-deleted marker.

When a checkbox 540 (or another distinctive and designated shape or a page button, such as, in one embodiment, a button 550) is hand drawn on a margin or pressed, clipping instruction are provided to the system, in which case all selected fragments are immediately copied from the page and formatted. In one embodiment, different fragments are started with a separating line or other separator and supplied with a fragment number or automatically generated title and saved to designated storage, such as Evernote notebook or other personal, shared or public database, local computer file, etc. In one embodiment, the selection markers are immediately cleared from page margins of principal page item after clipping. In another embodiment, special gesture or a button is required to clear the selection marker(s).

It should be noted that the proposed technique may be sensitive to diverse page formatting options, such as resizing of browser window, changing display settings, etc. In one embodiment, selection markers are resized and redrawn every time when content of principal page item is re-formatted, based on position of text and other page objects previously selected and tracked during re-formatting. In another embodiment, selection markers are deemed incompatible with re-formatting and, at the start of such re-formatting, a warning is displayed to a user where, if page re-formatting continues, selection markers are immediately deleted.

Various embodiments discussed herein may be combined with each other in appropriate combinations in connection with the system described herein. Additionally, in some instances, the order of steps in the flowcharts, flow diagrams and/or described flow processing may be modified, where appropriate. Subsequently, elements and areas of screen described in screen layouts may vary from the illustrations presented herein. Further, various aspects of the system described herein may be implemented using software, hardware, a combination of software and hardware and/or other computer-implemented modules or devices having the described features and performing the described functions.

Software implementations of the system described herein may include executable code that is stored in a computer readable medium and executed by one or more processors. The computer readable medium may be non-transitory and include a computer hard drive, ROM, RAM, flash memory, portable computer storage media such as a CD-ROM, a DVD-ROM, a flash drive and/or other drive with, for example, a universal serial bus (USB) interface, an SD Card and/or any other appropriate tangible or non-transitory computer readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of extracting principal content from Web pages, comprising:
   identifying and classifying items on the Web page;
   building a list of candidates;
   calculating candidate scores that vary according to a plurality of weights assigned to paragraphs and images of the Web page, wherein a particular paragraph is provided with a first weight based on a number of lines in the particular paragraph and is provided with a second weight based on a number of words in the particular paragraph, the first weight being independent of the second weight and a particular image is provided with a weight based on a size of the particular image;

selecting a top score candidate;

performing clean up processing for the top score candidate; and performing final page processing for the top score candidate.

2. A method, according to claim 1, where a word length of CJK (Chinese-Japanese-Korean) text is determined according to punctuation therein.

3. A method, according to claim 1, wherein calculating candidate scores includes determining an Initial Score using the formula:

$$\text{Initial Score} = 1000 \times (1.5 \times (N_{5\text{-}line\text{-}paragraphs} + N_{80\text{-}word\text{-}paragraphs}) + N_{3\text{-}line\text{-}paragraphs} + N_{50\text{-}word\text{-}paragraphs} + 3 \times N_{large\text{-}images} - 0.5 \times (N_{small\text{-}images} + N_{skipped\text{-}images}))$$

where $N_{5\text{-}line\text{-}paragraphs}$ is a number of five line paragraphs in the candidate, $N_{80\text{-}word\text{-}paragraphs}$ is a number of 80 word paragraphs in the candidate, $N_{3\text{-}line\text{-}paragraphs}$ is a number of 3 line paragraphs in the candidate, $N_{50\text{-}word\text{-}paragraphs}$ is a number of 50 word paragraphs in the candidate, $N_{large\text{-}images}$ is a number of images that contain at least 50K pixels or have a width of at least 350 pixels and a height of at least 75 pixels, $N_{skipped\text{-}images}$ is a number of images that have a size not exceeding 5×5 or are present on Web page as references to at least one of: blacklisted and quarantined sites, and all other images are count toward $N_{small\text{-}images}$.

4. A method, according to claim 1, wherein candidate scores are modified according to a number of containers and pieces and wherein a container is a Web page element that is associated with tags 'body', 'div', 'td', 'li', 'article/section' and pieces are candidates that do not include other candidates.

5. A method, according to claim 4, wherein candidate scores are modified using a formula:

$$\text{Modified Initial Score} = \text{Initial Score} \times (\tfrac{1}{3} + \tfrac{2}{3} \times \tfrac{1}{3} \times (1/N_{pieces} + 1/N_{candidates} + 1/N_{containers})).$$

6. A method, according to claim 4, wherein candidate scores are modified according to a number of ratios corresponding to text and link density.

7. A method, according to claim 6, wherein the ratios include a ratio of a length of regular text for the candidate to a total length of regular text, a number of words in regular text of the candidate to a total number of words in regular text, a length of regular text above the candidate to a total length of regular text, and a number of words in regular text above the candidate to a total number of words in regular text.

8. A method, according to claim 7, wherein candidate scores are modified using a formula:

$$\text{Modified Initial Score}_{n+1} = \text{Modified Initial Score}_n \times (\text{Percentage}_n \times (\text{ratio}^{degree})_n + (100 - \text{Percentage}_n))/100$$

wherein $\text{Percentage}_n$ and $\text{ratio}^{degree}$ are predetermined values that are empirically determined for each of n ratios.

9. A method, according to claim 1, further comprising:

following selecting the top score candidate, determining if the top score candidate meets predetermined criteria; and if the top score candidate does not meet predetermined criteria, determining if a different top score candidate should be selected.

10. A method, according to claim 9, wherein a first set of formulas is used to determine the top score candidate and a second, different, set of formulas is used to determine if a different top score candidate should be selected.

11. A method, according to claim 10, wherein a different top score candidate is not used if using the second set of formulas results in the same top score candidate as using the first set of formulas.

12. A method, according to claim 9, wherein the predetermined criteria is selected from the group consisting of: whether the top score candidate has less than 25 embedded containers, wherein a container is a Web page element that is associated with tags 'body', div', 'td', 'article/section', whether the top score candidate has no embedded other candidates and whether the top score candidate has no more than three embedded candidates that have other embedded candidates.

13. A method, according to claim 1, wherein performing clean up processing includes removing floating elements, link boxes, navigation panels, and videos from unknown sources.

14. A method, according to claim 1, wherein performing clean up processing includes reformatting the top scoring candidate by rewriting the text thereof as a new HTML page using only feasible HTML, tags and attributes and ignoring stylistic deficiencies and unnecessary elements in the original page format.

15. A method, according to claim 1, further comprising:

a user providing an indication of portions of a displayed top score candidate; and clipping portions indicated by the user, wherein the portions are subsequently used by other software.

16. A non-transitory computer-readable medium containing software that extracts principal content from Web pages, the software comprising:

executable code that identifies and classifies items on the Web page;

executable code that builds a list of candidates;

executable code that calculates candidate scores that vary according to a plurality of weights assigned to paragraphs and images of the Web page, wherein a particular paragraph is provided with a first weight based on a number of lines in the particular paragraph and is provided with a second weight based on a number of words in the particular paragraph, the first weight being independent of the second weight and a particular image is provided with a weight based on a size of the particular image;

executable code that selects a top score candidate;

executable code that performs clean up processing for the top score candidate; and executable code that performs final page processing for the top score candidate.

17. A non-transitory computer-readable medium, according to claim 16, where a word length of CJK (Chinese-Japanese-Korean) text is determined according to punctuation therein.

18. A non-transitory computer-readable medium, according to claim 16, wherein executable code that calculates candidate scores determines an Initial Score using the formula:

$$\text{Initial Score} = 1000 \times (1.5 \times (N_{5\text{-}line\text{-}paragraphs} + N_{80\text{-}word\text{-}paragraphs}) + N_{3\text{-}line\text{-}paragraphs} + N_{50\text{-}word\text{-}paragraphs} + 3 \times N_{large\text{-}images} - 0.5 \times (N_{small\text{-}images} + N_{skipped\text{-}images}))$$

where $N_{5\text{-}line\text{-}paragraphs}$ is a number of five line paragraphs in the candidate, $N_{80\text{-}word\text{-}paragraphs}$ is a number of 80 word paragraphs in the candidate, $N_{3\text{-}line\text{-}paragraphs}$ is a number of 3 line paragraphs in the candidate, $N_{50\text{-}word\text{-}paragraphs}$ is a number of 50 word paragraphs in the candidate, $N_{large-images}$ is a number of images that contain at least 50K pixels or have a width of at least 350 pixels and a height of at least 75 pixels, $N_{skipped-images}$ is a number of images that have a size not exceeding 5×5 or are present on Web page as references to at least one of: blacklisted and quarantined sites, and all other images are count toward $N_{small-images}$.

19. A non-transitory computer-readable medium, according to claim 16, wherein candidate scores are modified according to a number of containers and pieces and wherein a container is a Web page element that is associated with tags 'body', 'div', 'td', 'li', 'article/section' and pieces are candidates that do not include other candidates.

20. A non-transitory computer-readable medium, according to claim 19, wherein candidate scores are modified using a formula:

Modified Initial Score=Initial Score×(⅓+⅔×⅓×(1/$N_{pieces}$+1/$N_{candidates}$+1/$N_{containers}$)).

21. A non-transitory computer-readable medium, according to claim 19, wherein candidate scores are modified according to a number of ratios corresponding to text and link density.

22. A non-transitory computer-readable medium, according to claim 21, wherein the ratios include a ratio of a length of regular text for the candidate to a total length of regular text, a number of words in regular text of the candidate to a total number of words in regular text, a length of regular text above the candidate to a total length of regular text, and a number of words in regular text above the candidate to a total number of words in regular text.

23. A non-transitory computer-readable medium, according to claim 22, wherein candidate scores are modified using a formula:

Modified Initial Score$_{n+1}$=Modified Initial Score$_n$× (Percentage$_n$×(ratio$^{degree}$)$_n$+(100−Percentage$_n$))/ 100 wherein Percentage$_n$ and ratio$^{degree}$ are predetermined values that are empirically determined for each of n ratios.

24. A non-transitory computer-readable medium, according to claim 16, further comprising:

executable code that determines if the top score candidate meets predetermined criteria following selecting the top score candidate; and executable code that determines if a different top score candidate should be selected if the top score candidate does not meet the predetermined criteria.

25. A non-transitory computer-readable medium, according to claim 24, wherein a first set of formulas is used to determine the top score candidate and a second, different, set of formulas is used to determine if a different top score candidate should be selected.

26. A non-transitory computer-readable medium, according to claim 25, wherein a different top score candidate is not used if using the second set of formulas results in the same top score candidate as using the first set of formulas.

27. A non-transitory computer-readable medium, according to claim 24, wherein the predetermined criteria is selected from the group consisting of: whether the top score candidate has less than 25 embedded containers, wherein a container is a Web page element that is associated with tags 'body', 'div', 'td', 'li', 'article/section', whether the top score candidate has no embedded other candidates and whether the top score candidate has no more than three embedded candidates that have other embedded candidates.

28. A non-transitory computer-readable medium, according to claim 16, wherein executable code that performs clean up processing removes floating elements, link boxes, navigation panels, and videos from unknown sources.

29. A non-transitory computer-readable medium, according to claim 16, wherein executable code that performs clean up processing reformats the top scoring candidate by rewriting the text thereof as a new HTML page using only feasible HTML tags and attributes and ignoring stylistic deficiencies and unnecessary elements in the original page format.

30. A non-transitory computer-readable medium, according to claim 16, further comprising:

executable code that clips portions indicated by the user, wherein the portions are subsequently used by other software.

\* \* \* \* \*